(No Model.)
J. G. HAILER.
POWER TRANSMITTING DEVICE.
No. 600,072. Patented Mar. 1, 1898.
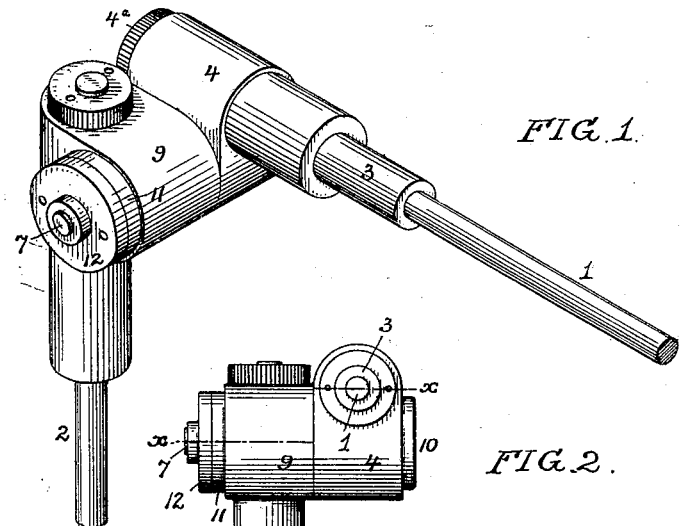
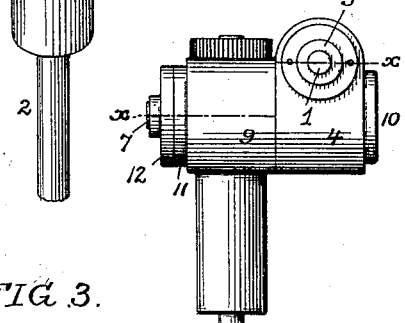
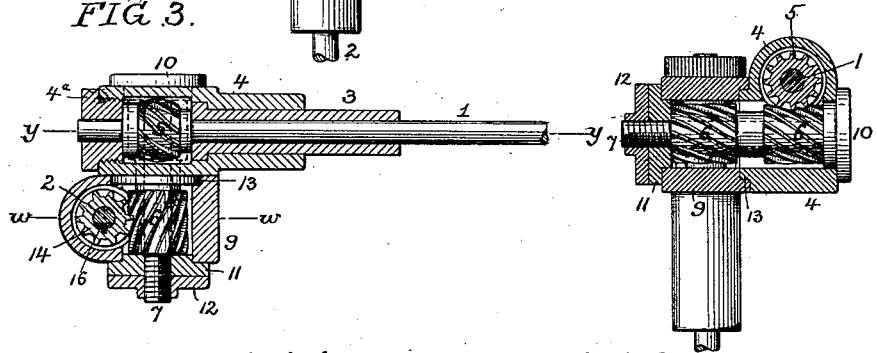
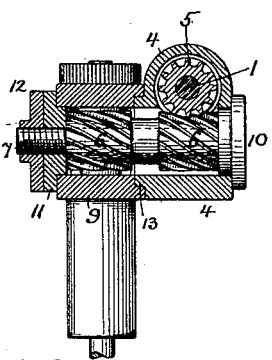
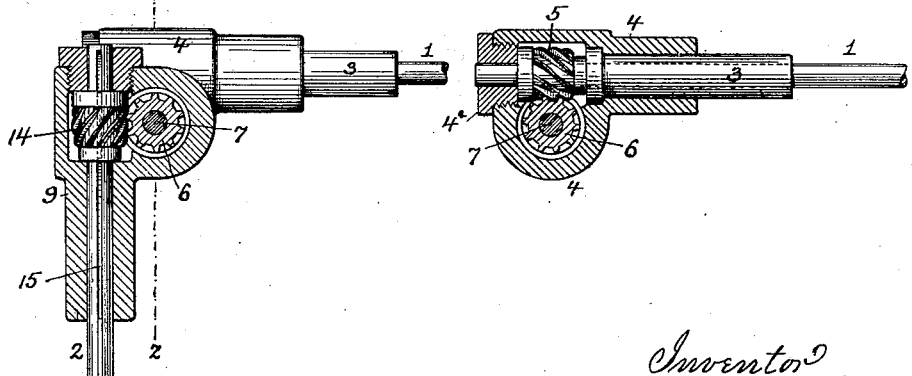
Witnesses:
Frank P. Brown
Charles DeBou
Inventor
John G. Hailer
by his Attorneys
Howson & Howson
THE NORRIS PETERS CO., PHOTO-LITHO., WASHINGTON, D. C.

UNITED STATES PATENT OFFICE.

JOHN G. HAILER, OF PHILADELPHIA, PENNSYLVANIA.

POWER-TRANSMITTING DEVICE.

SPECIFICATION forming part of Letters Patent No. 600,072, dated March 1, 1898.

Application filed April 30, 1897. Serial No. 634,604. (No model.)

*To all whom it may concern:*

Be it known that I, JOHN G. HAILER, a citizen of the United States, residing in Philadelphia, Pennsylvania, have invented certain Improvements in Power-Transmitting Devices, of which the following is a specification.

The object of my invention is to construct a simple, compact, and efficient device whereby power may be positively transmitted from one rotating shaft to another, while at the same time universal adjustment of the driven shaft in respect to the driving-shaft is permitted without deranging or in any way interfering with the operation of the transmitting-gears, by "universal adjustment" being meant the movement of the driven shaft to any angle or position in respect to the driving-shaft which the character of the work to be performed may require, the device being intended as a substitute for the flexible shafts which are now extensively used in connection with dental engines or other forms of machinery in which perfect flexibility of the driving mechanism is required to permit the free handling of the tool which is being driven.

In the accompanying drawings, Figure 1 is a perspective view of a power-transmitting device such as forms the subject of my invention. Fig. 2 is an end elevation of the same. Fig. 3 is a view, partly in elevation and partly in section, on the line *x x*, Fig. 2. Fig. 4 is a sectional view on the line *w w*, Fig. 3, with parts in elevation. Fig. 5 is a sectional view on the line *y y*, Fig. 3, with parts in elevation; and Fig. 6 is a sectional view on the line *z z*, Fig. 4, with parts in elevation.

1 represents the driving-shaft, and 2 the shaft to be driven, said shaft 1 having a bearing in a sleeve 3, upon which is mounted, so as to be free to turn, a gear-case 4, the latter having at the outer end a plug 4ª, which constitutes a bearing for the outer end of the shaft 1, the sleeve 4 being intended to be secured to the arm, post, hanger, or other structure which carries the driving device and the gear-case 4 being free to turn on said sleeve.

Secured to the driving-shaft 1 is a spiral gear-wheel 5, which meshes with one portion of a duplex spiral pinion 6, the latter being mounted upon a pin 7 and being free to turn in an opening in the gear-case 4 and also in an opening in a gear-case 9, lying alongside of and in contact with said gear-case 4, the pin 7 having at one end a head 10 and at the other end a nut 11 and a lock-nut 12, the nut 11 fitting into the end of the opening in the casing 9, so that the pin 7 and its nuts serve to properly retain in contact with each other the casings 4 and 9, an annular rib or projection 13 on the casing 4 fitting into a like annular recess or groove in the casing 9, so as to preserve said casings in proper lateral relation to each other, whereby any swinging or turning movement of one casing in respect to the other must be concentric with the axis of the gear 6.

The driven shaft 2 is adapted to bearings in the gear-case 9 and has a spiral toothed gear 14, which meshes with the spiral pinion 6, so that when power is applied to the shaft 1 the turning of the same and its spiral gear 5 will cause the turning of the spiral pinion 6 around the pin 7, and said gear 6 will turn the spiral gear 14 and shaft 2.

Both casings 4 and 9 are free to swing or turn around the axis of the shaft 1, and the casing 9 is also free to swing or turn around the axis of the gear 6, and as these two axes are at right angles to each other it follows that universal movement of the shaft 2 in respect to the shaft 1 will be permitted without any derangement of the gearing or interference with the proper transmission of power from one shaft to the other.

The shaft 2 may, if desired, be longitudinally grooved, as shown at 15 in Fig. 4, for the reception of a spline or feather 16, carried by the pinion 14, so that said shaft 2, while caused to rotate with the pinion, can be moved to and fro through the same.

Having thus described my invention, I claim and desire to secure by Letters Patent—

1. A power-transmitting device consisting of the driving and driven shafts each having a spiral gear, a spiral pinion meshing with both of said spiral gears and having its axis disposed at right angles to the axes of the two shafts, and gear-casings one having bearings on each side of the spiral gear for the driving-shaft and the other having bearings on each side of the spiral gear for the driven shaft, both of said casings having openings for the reception of the spiral pinion, the driving-gear case being free to turn around the axis of the driving-shaft and the driven-gear case being free to turn around the axis of the spiral pinion, substantially as specified.

2. A power-transmitting device consisting of the driving and driven shafts each having a spiral gear, a spiral pinion meshing with said spiral gears and disposed with its axis at right angles to the axes of the two shafts, a driving-gear case free to turn around the axis of the driving-shaft and having on one side of the spiral gear a shaft-bearing forming part of the casing, and on the other side of the spiral gear a shaft-bearing detachable from the casing, and a driven-gear case free to turn around the axis of the pinion, and likewise having on one side of the spiral gear a shaft-bearing forming part of the casing, and on the other side of said gear a shaft-bearing detachable from the casing, substantially as specified.

In testimony whereof I have signed my name to this specification in the presence of two subscribing witnesses.

JOHN G. HAILER.

Witnesses:
JOS. H. KLEIN,
F. E. BECHTOLD.